(12) United States Patent
Hoang (10) Patent No.: US 7,318,426 B2
(45) Date of Patent: Jan. 15, 2008

(54) FUEL-CONTROL MANIFOLD WITH BROAD-RANGE TEMPERATURE AND PRESSURE CAPABILITY

(75) Inventor: Thao Hoang, Laguna Niguel, CA (US)

(73) Assignee: Circle Seal Controls, Inc., Corona, CA (US)

( * ) Notice: Subject to any disclaimer, the term of this patent is extended or adjusted under 35 U.S.C. 154(b) by 105 days.

(21) Appl. No.: 09/972,449

(22) Filed: Oct. 5, 2001

(65) Prior Publication Data

US 2003/0066565 A1    Apr. 10, 2003

(51) Int. Cl.
*F02B 43/00*    (2006.01)
(52) U.S. Cl. .................. 123/527; 123/525; 123/1 A
(58) Field of Classification Search ............... 123/527, 123/525, 1 A
See application file for complete search history.

(56) References Cited

U.S. PATENT DOCUMENTS

| 5,361,796 | A |   | 11/1994 | Mutter |        |
|-----------|---|---|---------|--------|--------|
| 5,775,309 | A | * | 7/1998  | Burrahm | 123/527 |
| 5,794,666 | A | * | 8/1998  | Yanagawa et al. | 123/527 |
| 6,041,762 | A | * | 3/2000  | Sirosh et al. | 123/527 |
| 6,068,017 | A | * | 5/2000  | Haworth et al. | 123/527 |
| 6,112,760 | A |   | 9/2000  | Scott et al. | |
| 6,142,128 | A | * | 11/2000 | Gobbi | 123/527 |
| 6,240,909 | B1| * | 6/2001  | Scott | 123/527 |

FOREIGN PATENT DOCUMENTS

EP    0790554 A1    2/1997

* cited by examiner

*Primary Examiner*—Stephen K. Cronin
(74) *Attorney, Agent, or Firm*—McNees Wallace & Nurick LLC (57) ABSTRACT

A fuel-control manifold has a non-integral body with at least three pieces joined together. The fuel-control manifold has a tank port, an engine supply port, a fueling port, and a shutoff valve, all in the upper body segment. The shutoff valve includes a controllable shutoff valve closure having a shutoff-valve first side in fluid flow communication with the tank port and a shutoff-valve second side in fluid flow communication with the engine supply port and with the fueling port. There are a defueling port in a lower body segment, a vent port in the upper body segment, and a defuel/vent valve in a middle body segment. The defuel/vent valve includes a controllable ball-valve defueling closure having a defueling-valve first side in fluid-flow communication with the shutoff-valve second side and a defueling-valve second side in fluid-flow communication with the defueling port, and a controllable ball-valve vent closure having a vent-valve first side in fluid-flow communication with the vent port, and a vent-valve second side in fluid-flow communication with the defueling-valve second side. The defueling closure and the vent closure are mounted on a common defuel/vent valve stem, and the defueling closure and the vent closure cannot be open at the same time.

15 Claims, 5 Drawing Sheets

FUEL-CONTROL MANIFOLD WITH BROAD-RANGE TEMPERATURE AND PRESSURE CAPABILITY

This invention relates to a fuel-control manifold such as that used in a compressed natural gas vehicle and, more particularly, to such a fuel-control manifold having the ability to function over a wide temperature range and wide pressure range without leakage.

BACKGROUND OF THE INVENTION

Alternative-fuel vehicles offer the potential for the reduction of pollutants in congested areas such as cities. One of the most promising alternative fuels among the wide variety of possible alternative fuels is compressed natural gas (CNG), and vehicles operating from CNG are currently in operation. The CNG fuel is provided at a fueling station and is filled into pressure tanks on the vehicle at a maximum pressure on the order of 4000-6000 pounds per square inch (psi). The fuel is thereafter gradually fed from the pressure tanks into the engine of the vehicle. It is sometimes necessary to remove the fuel from the vehicle, including the pressure tanks and the fuel-flow system, a process called defueling.

A set of standard requirements and specifications, such as found in NGV (Natural Gas Vehicle) 3.1 and NFPA (National Fire Protection Association) 52, for the operation of such alternative-fuel vehicles has been developed. These standards cover physical structures such as standards for fueling valves, so as to promote rapid adoption of uniform fueling equipment. These standards also cover operating conditions so that the alternative-fuel vehicles meeting the standard will be operable and safe in all normal operating conditions envisioned by those writing the standards. The operating-conditions standards also provide designers with a uniform set of conditions and ranges for which equipment must be designed.

One of the important requirements of NGV 3.1 is that the fuel system must be operable and leak free at pressures of from 2 percent to 150 percent of the rated service pressure, and over a temperature range of from −40° F. to +180° F. The rated service pressure is typically established at about 3600-4000 psi, so that the broadest range of pressure requirements for leak-free operation is from 72 psi (2 percent of 3600 psi) to 6000 psi (150 percent of 4000 psi). Fuel systems using discrete valving elements that meet these operating ranges are available. However, these discrete-element fuel systems may be prone to the development of leaks under some conditions and also have economic disadvantages.

A fill block having an integral one-piece body, designed by employees of Circle Seal Corporation and set forth in U.S. Pat. No. 6,240,909, reduces the potential for leaks by minimizing and removing many of the plumbing runs that constitute possible leak paths, and also reduces assembly and maintenance costs as compared with discrete valving systems. However, this design has shortcomings which render it unsuitable for many applications in alternative-fuel vehicles. Chief among these shortcomings is that the fill block using the integral one-piece body of the '909 patent cannot meet the requirements of NGV 3.1. Specifically, the fill block having the integral one-piece body of the '909 patent cannot function in a leak-free manner over the entire range of pressures and temperatures required by NGV 3.1.

There is accordingly a need for an improved fuel-control system for use in alternative-fuel vehicles. The present invention fulfills this need, and further provides related advantages.

SUMMARY OF THE INVENTION

The present invention provides a fuel-control manifold that is suitable for use in alternative-fuel vehicles such as CNG vehicles. The present fuel-control manifold achieves complete CNG fuel interconnection of the fuel tank, engine, fueling port, defueling port, and vent port, as well as optional instrumentation ports, in a single device that minimizes the chances of leaks. Further, the fuel-control manifold is fully operable over the fuel-pressure range of from 72 to 6000 psi and the temperature range of form −40° F. to +180° F. as set forth in NGV 3.1. The present manifold is also operable in conjunction with other alternative fuels such as hydrogen, propane, and the like.

In accordance with one embodiment of the invention, a fuel-control manifold comprises a non-integral body comprising at least three pieces joined together and including an upper body segment, a middle body segment, and a lower body segment, a tank port in the upper body segment, an engine supply port in the upper body segment, a fueling port in the upper body segment, and a shutoff valve in the upper body segment. The shutoff valve, which is preferably, but not necessarily, a ball valve, includes a controllable shutoff valve closure having a shutoff-valve first side in fluid flow communication with the tank port and a shutoff-valve second side in fluid flow communication with the engine supply port and with the fueling port. The fuel-control manifold further includes a defueling port in the lower body segment, a vent port in the upper body segment, and a defuel/vent valve in the middle body segment. The defuel/vent valve comprises a controllable ball-valve defueling closure having a defueling-valve first side in fluid-flow communication with the shutoff-valve second side and a defueling-valve second side in fluid-flow communication with the defueling port. The defuel/vent valve further comprises a controllable ball-valve vent closure having a vent-valve first side in fluid-flow communication with the vent port, and a vent-valve second side in fluid-flow communication with the defueling-valve second side. The defueling closure and the vent closure are mounted on a common defuel/vent valve stem. The defueling closure and the vent closure cannot be open at the same time. There may be an instrumentation port in the upper body segment, with the instrumentation port in fluid-flow communication with the shutoff-valve second side. Desirably, the defuel/vent valve has no elastomeric materials in the direct sealing/flow path.

In another embodiment, a fuel-control manifold comprises a body, a tank port in the body, an engine supply port in the body, a fueling port in the body, and a shutoff valve in the body. The shutoff valve, which is preferably a ball valve, includes a controllable shutoff valve closure having a first shutoff-valve side in fluid flow communication with the tank port and a second shutoff-valve side in fluid flow communication with the engine supply port and the fueling port. The fuel-control manifold further includes a defueling port in the body, a vent port in the body, and a defuel/vent valve in the body. The defuel/vent valve comprises a defuel/vent valve closure structure including a controllable ball-valve defueling closure having a first defueling-valve side in fluid-flow communication with the second shutoff-valve side and a second defueling-valve side in fluid-flow communication with the defueling port. The defuel-vent valve further comprises a controllable ball-valve vent closure having a vent-valve first side in fluid-flow communication with the vent port, and a vent-valve second side in fluid-flow communication with the defueling-valve second side. The defueling closure and the vent closure being mounted on a common defuel/vent valve stem. The defueling closure and the vent closure cannot be open at the same time. There may be an instrumentation port in the body, with the instrumentation port in fluid-flow communication with the shutoff-valve second side.

In this second embodiment, the body preferably has three separate segments that are joined together, and the shutoff valve is in an upper body segment and the defuel-valve is in a middle body segment. Again, desirably the defuel/vent valve closure structure has no elastomeric materials therein and the shutoff valve closure is a ball-valve closure.

In a third embodiment, a fuel-control manifold comprises a body, a tank port in the body, an engine supply port in the body, a fueling port in the body, and a shutoff valve in the body. The shutoff valve, which is preferably a ball valve, includes a controllable shutoff valve closure having a shutoff-valve first side in fluid flow communication with the tank port and a shutoff-valve second side in fluid flow communication with the engine supply port and the fueling port. The fuel-control manifold further includes a defueling port in the body, a vent port in the body, and a defuel/vent valve in the body. The defuel/vent valve includes a defuel/vent valve closure structure providing alternative controllable fluid communication between the defueling port and the shutoff-valve second side in a first operating position, and between the defueling port and the vent port in a second operating position. The defuel/vent valve closure structure has no elastomeric materials therein. Instead, the defuel/vent valve closure structure typically comprises at least one nonmetallic solid component that seals the defuel/vent valve closure structure, and each nonmetallic solid component is a thermosetting polymer. A preferred thermosetting polymer is a fluoropolymer such as polytetrafluoroethylene.

Desirably, the body has three separate segments that are joined together, with the shutoff valve in an upper body segment and the defuel-valve in a middle body segment. There may be an instrumentation port in the body, with the instrumentation port in fluid-flow communication with the shutoff-valve second side. Preferably, the defuel/vent valve closure structure comprises a controllable ball-valve defueling closure having a first defueling-valve side in fluid-flow communication with the second shutoff-valve side and a second defueling-valve side in fluid-flow communication with the defueling port, and a controllable ball-valve vent closure having a vent-valve first side in fluid-flow communication with the vent port, and a vent-valve second side in fluid-flow communication with the defueling-valve second side. The defueling closure and the vent closure are preferably mounted on a common defuel/vent valve stem.

In a fourth embodiment, a fuel-control manifold comprises a body, a tank port in the body, an engine supply port in the body, a fueling port in the body, and a shutoff valve in the body. The shutoff valve includes a controllable shutoff valve closure having a shutoff-valve first side in fluid flow communication with the tank port and a shutoff-valve second side in fluid flow communication with the engine supply port and with the fueling port. The fuel-control manifold further includes a defueling port in the body, a vent port in the body, and a defuel/vent valve in the body. The defuel/vent valve comprises a defueling-valve first side in fluid-flow communication with the shutoff-valve second side and a defueling-valve second side in fluid-flow communication with the defueling port, and a vent-valve first side in fluid-flow communication with the vent port, and a vent-valve second side in fluid-flow communication with the defueling-valve second side. The defueling closure and the vent closure cannot be open at the same time. The shutoff valve and the defuel/vent valve being leak free over a temperature range of from −40° F. to +180° F. and over a pressure range of from 72 pounds per square inch to 6000 pounds per square inch.

In the work leading to the present invention, the present inventor discovered that the integral-one-piece body structure of the '909 patent, while operable under some conditions, does not remain leak free over the pressure-range requirements and the temperature-range requirements specified in NGV 3.1. When the defueling valve is opened at a low ambient temperature, the pressurized CNG fuel expands through the orifice of the spool valve used in the defueling valve, cools, and thereby cools the surrounding valve structure of the spool valve. The O-ring seals of the spool valve, which are necessarily made of elastomeric materials, are chilled to such low temperatures that they crack. The cracking of the O-ring seals is worsened by the rotation of the stem during the operation of the spool valve and the cycles of heating and cooling during defueling operations. Many different configurations of mechanical structure and materials of construction were tried in an attempt to make the integral one-piece body structure functional over the entire pressure and temperature range, but these attempts were unsuccessful. Thus, while the integral one-piece body structure of the '909 patent is desirable from the standpoint of compactness and avoidance of leakage, it cannot be made to work and to meet the pressure-range standards and the temperature-range standards now required for most commercially viable CNG-powered vehicles.

In the present approach, a defuel/vent valve has been developed which does not use elastomeric materials in the direct sealing/flow path of the defuel/vent valve closure structure (although elastomers are used to seal the stem and joining manifold surfaces). The defuel/vent valve preferably includes two ball-valve closures mounted on a common valve stem, the controllable ball-valve defueling closure and the controllable ball-valve vent closure. The valve seats of the ball-valve closures are made of thermosetting plastics, which do not harden and crack upon chilling and also are operable over the pressure range and the temperature range required by NGV 3.1. As a result, the fuel-control manifold is operable over the full temperature range and the full pressure range required by NGV 3.1.

The use of an integral, one-piece body structure would be desirable from the standpoint of avoiding leakage and simplicity. However, it was found that the designs of the valve closure structures required to meet the temperature and pressure ranges of NGV 3.1 also make a three-piece body design necessary in the most-preferred embodiments. By providing additional sealing between the body segments, the body may be made as a single structure rather than employing discrete components, even though it is not integral and is not one piece.

The present fluid-flow manifold thus is both a single structure that is convenient to use and is also fully operational over the temperature and pressure ranges required to adhere to NGV 3.1. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
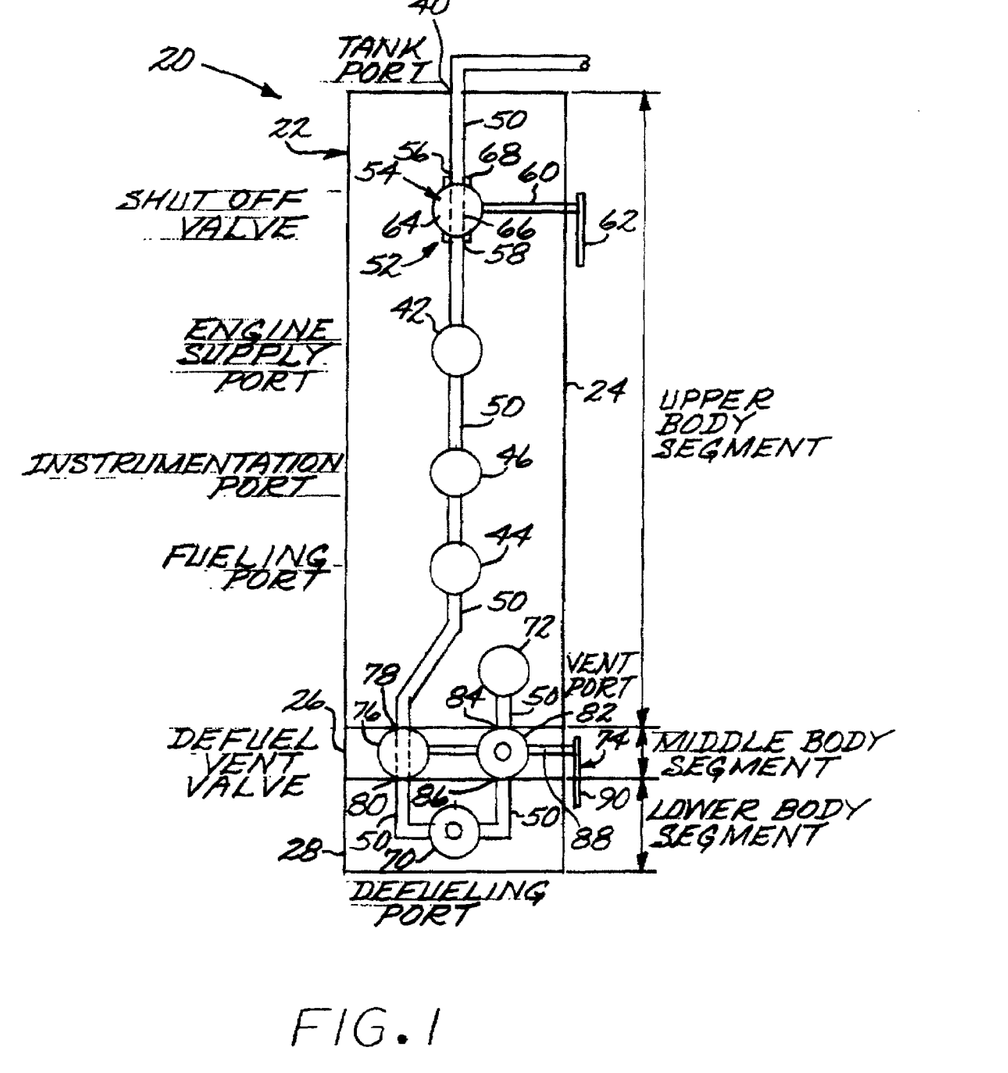
FIG. 1 is a schematic view of a fluid-flow manifold according to the invention.
Figure 2:
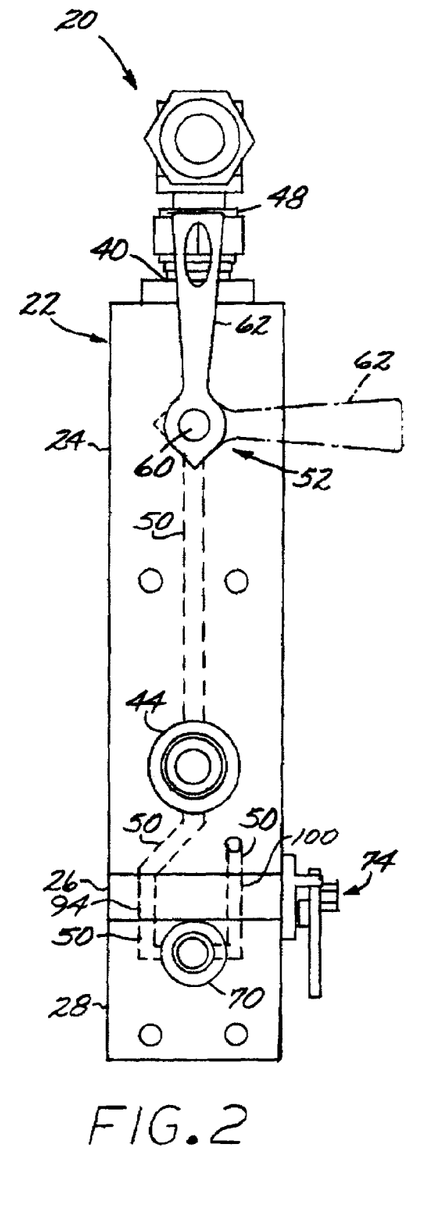
FIG. 2 is a first-side elevational view of the fluid-flow manifold.
Figure 3:
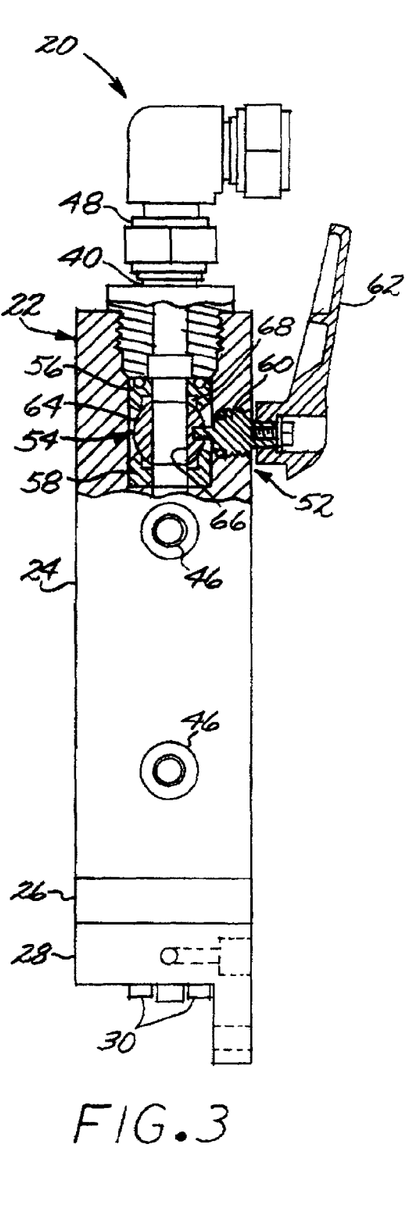
FIG. 3 is a second-side elevational view, with a portion shown in section, of the fluid-flow manifold.
Figure 4:
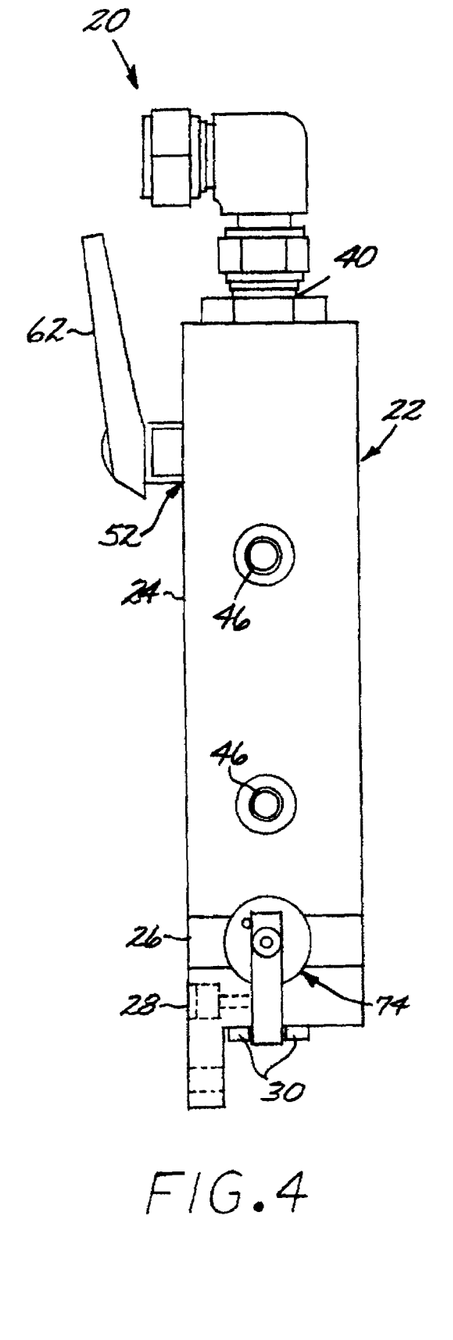
FIG. 4 is a third-side elevational view of the fluid-flow manifold.
Figure 5:
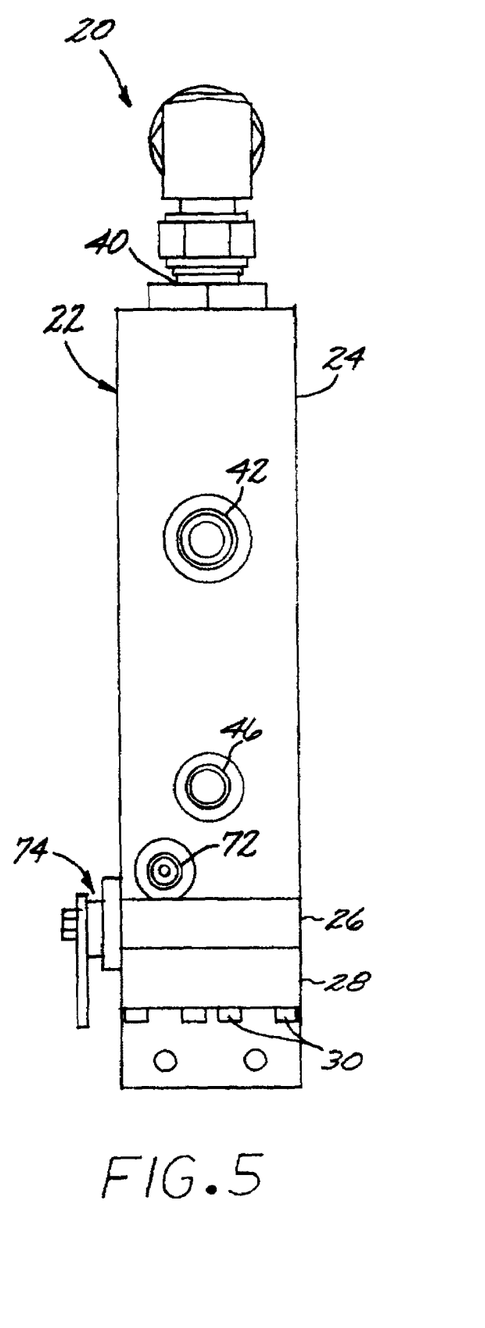
FIG. 5 is a fourth-side elevational view of the fluid-flow manifold.

FIGS. 1-6 depict a preferred embodiment of a fuel-control manifold 20, which is preferably used in a CNG-fueled-vehicle. FIG. 1 is a schematic view and places all of the components, flow channels, ports, and controls into a single plane for viewing of their interrelationships, and FIGS. 2-6 are representative of the preferred embodiment of the actual fuel-control manifold 20. The environment of the CNG-fueled vehicle application of the fuel-control manifold 20 is discussed in U.S. Pat. No. 6,240,909, whose disclosure is incorporated by reference in its entirety.

The fuel-control manifold 20 comprises a non-integral body 22. The non-integral body 22 is formed of at least three pieces joined together to form the non-integral body 22. The non-integral body 22 includes an upper body segment 24, a middle body segment 26, and a lower body segment 28, with planar interfaces therebetween. The reasons for using a non-integral, segmented body 22 will be discussed in greater detail subsequently, but in general it has been found that the preferred form of the defuel/vent valve cannot be constructed to meet the temperature-range requirements and the pressure-range requirements of NGV 3.1 when an integral body is used. The three segments 24, 26, and 28 are joined together by bolts 30 (FIGS. 3-5) and face seals 32 (FIG. 6) between the segments.

The non-integral body 22 includes a tank port 40, an engine supply port 42, a fueling port 44, and one or more optional instrumentation ports 46, all preferably located in the upper body segment 24. These ports 40, 42, 44, and 46 are each supplied with appropriate external connectors and check valves or, in the case of instrumentation ports that are not used, plugs. The tank port 40 is in fluid-flow communication with the vehicle's fuel tank (not shown), which is located external to the fuel-control manifold 20, through a rotating coupling 48 that facilitates the interconnection to the fuel tank. The engine supply port 42 is in fluid-flow communication with the vehicle's engine (not shown), which is located external to the fuel-control manifold 20. The fueling port 44 may be placed into fluid-flow communication with a supply of fuel (not shown), which is located external to the fuel-control manifold 20. The optional instrumentation ports 46 convey fluid flow or pressure to instrumentation (not shown), such as a pressure gauge or a temperature gauge, which is located external to the fuel-control manifold 20 and is in fluid-flow communication with the instrumentation port 46. A fluid-flow channel 50 provides fluid-flow communication between the tank port 40 (when the shutoff valve, discussed next, is in its open position), the engine supply port 42, the fueling port 44, and the optional instrumentation port 46, as well as with other structure to be discussed subsequently.

A shutoff valve 52 in the upper body segment 24 is positioned in the fluid-flow channel 50 at a location between the tank port 40 and the engine supply port 42. The shutoff valve 52 includes a controllable shutoff valve closure 54 having a shutoff-valve first side 56 in fluid flow communication through the fluid-flow channel 50 with the tank port 40, and a shutoff-valve second side 58 in fluid flow communication through the fluid-flow channel 50 with the engine supply port 42 and with the fueling port 44. The shutoff valve closure 54 is mounted on a shutoff-valve stem 60 that extends outwardly through the wall of the body 22 (with appropriate seals) and is rotatable by an external shutoff valve handle 62 that is affixed to the shutoff-valve stem 60 at a location remote from the shutoff valve closure 54. The shutoff valve closure 54 is preferably a ball valve having a shutoff valve ball 64 with a shutoff valve ball opening 66 therethrough. The shutoff valve ball 64 is supported in and rotates against a shutoff valve ball seat 68.

The non-integral body 22 further includes a defueling port 70 in the lower body segment 28 and a vent port 72 in the upper body segment 24. A defuel/vent valve 74 is located in the middle body segment 26. The defuel/vent valve 74 comprises a controllable ball-valve defueling closure 76 having a defueling-valve first side 78 in fluid-flow communication with the shutoff-valve second side 58, and a defueling-valve second side 80 in fluid-flow communication with the defueling port 70. The defuel/vent valve 74 also comprises a controllable ball-valve vent closure 82 having a vent-valve first side 84 in fluid-flow communication with the vent port 72, and a vent-valve second side 86 in fluid-flow communication with the defueling-valve second side 80. The fluid communication between the shutoff-valve second side 58, the ball-valve defueling closure 76, the defueling-valve second side 80, the defueling port 70, the ball-valve vent closure 82, and the vent port 72 may be accomplished using the fluid-flow channel 50 as it extends through the upper body segment 24 and the lower body segment 28 (as illustrated), or with any operable arrangement of interconnecting channels. The defueling closure 76 and the vent closure 82 are mounted on a common defuel/vent valve stem 88 which extends through the wall of the body 22 and is rotated by a defuel/vent valve handle 90 that is affixed to the defuel/vent valve stem 88 at a location remote from the defueling closure 76. The defueling closure 76 and the vent closure 82 cannot be open at the same time. This limitation is implemented in the preferred two-ball valve design with the planar fluid-flow channel 50 by positioning the through-passages of the closures 76 and 82 at 90 degrees to each other about the axis of the defuel/vent valve stem 88.

The '909 patent describes a CNG fuel system fill block with an integral one-piece body. In tests of this design, it was found that when the defueling valve was subject to premature failure. When defueling was attempted at a low ambient temperature as required by NGV 3.1, the expansion of the pressurized CNG fuel through the orifice of the spool valve cooled the valve structure and chilled the O-ring seals of the spool valve to such low temperatures that they crack. The deterioration of the O-ring seals is accelerated by the rotation of the stem during the operation of the spool valve and the cycles of heating and cooling experienced by the valve during service. Many different configurations of mechanical structure and materials of construction were tried in an attempt to make the integral one-piece body structure functional over the entire temperature range specified by NGV 3.1, but these attempts were unsuccessful.

Figure 6:
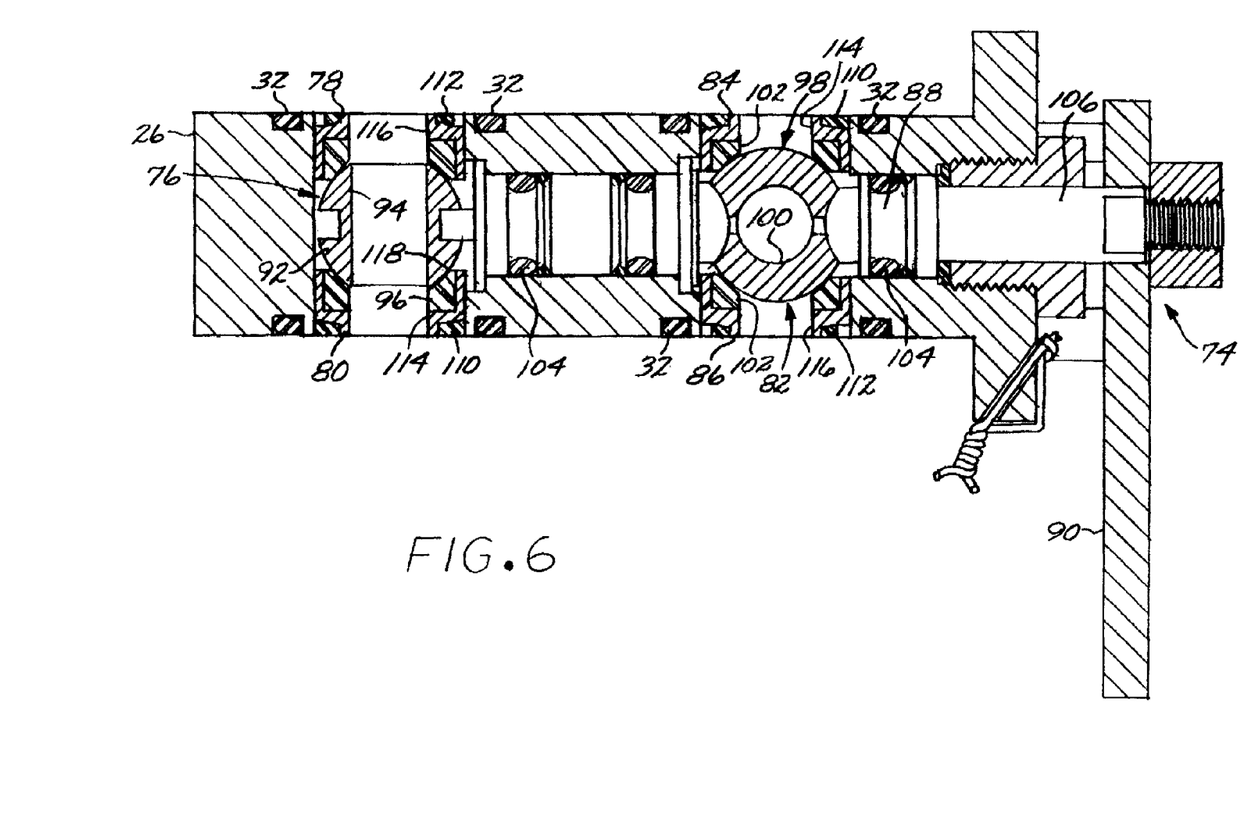
FIG. 6 is a sectional view of the middle body segment and the defuel/vent valve.

In the two-ball defuel/vent valve 74 of FIG. 6, the ball-valve defueling closure 76 includes a defuel ball closure 92 having an opening 94 therethrough whose diameter is substantially the same cross-sectional size as the fluid-flow channel 50. The defuel ball closure 92 is supported in a pair of ring seats or seals 96 that are made of a non-elastomer material, preferably a fluoropolymer such as chlorotrifluoroethylene. Similarly the ball-valve vent closure 82 includes a vent ball closure 98 having an opening 100 therethrough. The vent ball closure 98 is supported on a pair of ring seats or seals 102 that are made of a non-elastomer material, preferably a fluoropolymer such as chlorotrifluoroethylene. The defuel/vent valve 74 thus has no elastomers associated with the ball closures 92 and 98 in the direct sealing/flow path. Such elastomers would tend to degrade at low temperatures and crack in the ball-sealing application. There are, however, elastomeric seals 104 that seal the stem 106 of the fuel/vent valve 74, well outside of the direct sealing/flow path.

The sealing mechanics between the seats and balls depends upon forces resulting from system pressure differentials and from mechanical preloading. In the closed position, the system differential pressure pushes the ball against the seat on the lower-pressure side to create a tight seal. When the differential pressure is small (i.e., 2 percent of the service pressure per NGV 3.1), however, the seal results from a mechanical spring force pushing the ring seals 96 and 102 against their respective ball closures 92 and 98. The spring force is produced by the seals 110 and 112 pressing against their respective retainers 114 and 116, which in turn press against the respective ring seals 96 and 102, which in turn press against the ball closures 92 and 98. The ring seals 96 and 102 are formed with a radius of curvature on the sides facing the ball closures 92 and 98 that is larger than the radius of the ball closures 92 and 98, producing a line contact 118 between the ring seals and the balls. The relatively small spring force resulting from the seals 110 and 112 is thus able to produce a seal along the line contact 118 around the ball closures 92 and 98 that is effective at small differential pressures within the system. The spring force produced by the seals 110 and 112 therefore provides the sealing force at low pressures, and the fluid pressure differential provides the sealing force at higher pressures. The valve sealing is therefore tuned and optimized for sealing over the full operating temperature range and the full operating pressure range.

In analyzing and testing the sealing of the ball closures 92 and 98, it was found that insufficient mechanical preloading of the ring seals 96 and 102 will result in excessive leakage around the ball closures at low temperature and low pressure. The force balance required to achieve the proper sealing cannot be practically and reliably achieved in a single piece body using available manufacturing techniques. In the preferred embodiment illustrated in FIG. 6, it was determined by an analysis of tolerance stackups that, if this valve were manufactured as a slide-in element that would be received in a recess machined into an integral, one-piece manifold, the proper loading on the seals 110 and 112 could not be achieved because of the required clearance to insert the valve element. Consequently, the three-segment, non-integral body 22 was required. This design has metal-to-metal contacts between the middle body segment 26 and the upper body segment 24, on the one hand, and between the middle body segment 26 and the lower body segment 28, on the other hand. When the bolts 30 are tightened, the resulting pressure generated by the seals 110 and 112 is correct for ensuring the sealing of the ball closures 92 and 98 at low fluid pressures. Thus, the requirement for the three-piece non-integral body 22 for the preferred manifold configuration is a direct result of the need to meet the wide temperature-range and pressure-range requirements of NGV 3.1.

Figure 7:
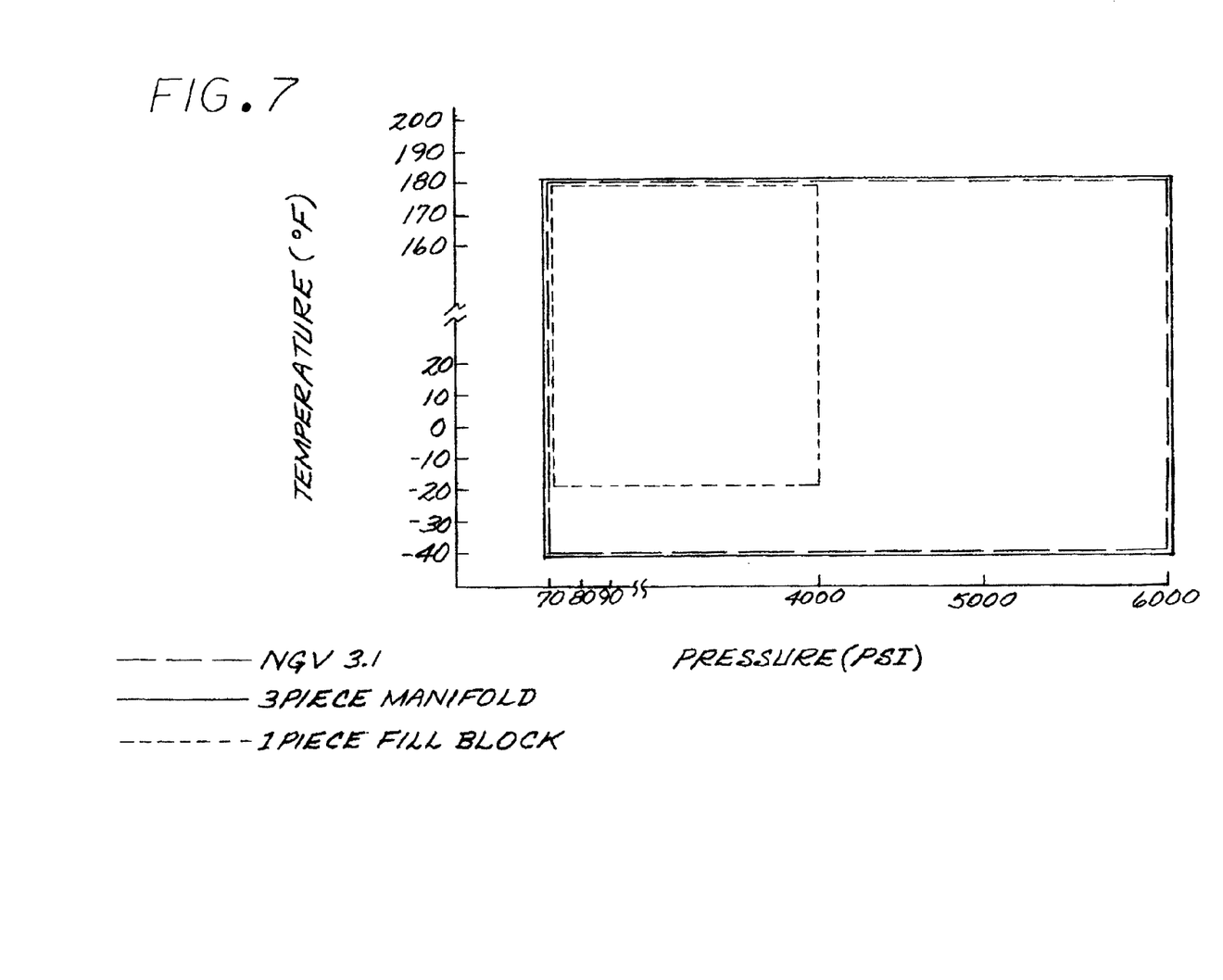
FIG. 7 is a graph depicting the performance envelopes of the three-piece fuel-control manifold and the fill block using the integral one-piece body, in comparison with the performance requirements of NGV 3.1.

The three-piece fuel-control manifold 20 and a best-practices embodiment of the fill block using the integral one-piece body of U.S. Pat. No. 6,240,909 were constructed and comparatively tested using CNG. FIG. 7 summarizes the temperature-pressure performance envelopes of the three-piece fuel-control mainfold 20 and the fill block using the integral one-piece body of U.S. Pat. No. 6,240,909, compared with the performance-envelope requirement established by NGV 3.1. The three-piece fuel-control manifold 20 was fully functional and reliable from −40° F. to +180° F. and from 2 percent (of 3600 psi, or 72 psi) to 150 percent (of 4000 psi, or 6000 psi) of the rated service pressure range of 3600 psi-4000 psi. The fill block using the integral one-piece body of U.S. Pat. No. 6,240,909 was functional over the pressure range of from 72 psi up to about 4000 psi, but was not functional at pressures over about 4000 psi; this fill block was functional over the temperature range of from −20° F. to +180° F., but it did not function properly and in a leak-free manner at the lower temperatures down to −40° F. required by NGV 3.1. During testing at the lower temperatures below −20° F. and approaching −40° F., the valve seals of the fill block using the integral one-piece body cracked and failed.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fuel-control manifold, comprising:
   a non-integral body comprising at least three pieces joined together and including an upper body segment, a middle body segment, and a lower body segment;
   a tank port in the upper body segment;
   an engine supply port in the upper body segment;
   a fueling port in the upper body segment;
   a shutoff valve in the upper body segment, the shutoff valve including a controllable shutoff valve closure having a shutoff-valve first side in fluid flow communication with the tank port and a shutoff-valve second side in fluid flow communication with the engine supply port and with the fueling port;
   a defueling port in the lower body segment;
   a vent port in the upper body segment; and
   a defuel/vent valve in the middle body segment, the defuel/vent valve comprising
      a controllable ball-valve defueling closure having a defueling-valve first side in fluid-flow communication with the shutoff-valve second side and a defueling-valve second side in fluid-flow communication with the defueling port, and
      a controllable ball-valve vent closure having a vent-valve first side in fluid-flow communication with the vent port, and a vent-valve second side in fluid-flow communication with the defueling-valve second side,
   wherein the defuel/vent valve has no elastomeric materials therein,
   wherein the defueling closure and the vent closure are mounted on a common defuel/vent valve stem, and wherein the defueling closure and the vent closure cannot be open at the same time.

2. The fuel-control manifold of claim 1, wherein the shutoff valve closure is a ball-valve closure.

3. The fuel-control manifold of claim 1, further including an instrumentation port in the upper body segment, the instrumentation port being in fluid-flow communication with the shutoff-valve second side.

4. A fuel-control manifold, comprising:
a body;
a tank port in the body;
an engine supply port in the body;
a fueling port in the body;
a shutoff valve in the body, the shutoff valve including a controllable shutoff valve closure having a shutoff-valve first side in fluid flow communication with the tank port and a shutoff-valve second side in fluid flow communication with the engine supply port and the fueling port;
a defueling port in the body;
a vent port in the body; and
a defuel/vent valve in the body, the defuel/vent valve comprising a defuel/vent valve closure structure including
  a controllable ball-valve defueling closure having a defueling-valve first side in fluid-flow communication with the second shutoff-valve side and a defueling-valve second side in fluid-flow communication with the defueling port, and
  a controllable ball-valve vent closure having a vent-valve first side in fluid-flow communication with the vent port, and a vent-valve second side in fluid-flow communication with the defueling-valve second side,
wherein the defuel/vent valve closure structure has no elastomeric materials therein,
wherein the defueling closure and the vent closure are mounted on a common defuel/vent valve stem, and
wherein the defueling closure and the vent closure cannot be open at the same time.

5. The fuel-control manifold of claim 4, wherein the body has three separate segments that are joined together, and wherein the shutoff valve is in an upper body segment and the defuel-valve is in a middle body segment.

6. The fuel-control manifold of claim 4, wherein the shutoff valve closure is a ball-valve closure.

7. The fuel-control manifold of claim 4, further including an instrumentation port in the body, the instrumentation port being in fluid-flow communication with the shutoff-valve second side.

8. A fuel-control manifold, comprising:
a body;
a tank port in the body;
an engine supply port in the body;
a fueling port in the body;
a shutoff valve in the body, the shutoff valve including a controllable shutoff valve closure having a shutoff-valve first side in fluid flow communication with the tank port and a shutoff-valve second side in fluid flow communication with the engine supply port and the fueling port;
a defueling port in the body;
a vent port in the body; and
a defuel/vent valve in the body, the defuel/vent valve including a defuel/vent valve closure structure providing alternative controllable fluid communication between the defueling port and the shutoff-valve second side in a first operating position, and between the defueling port and the vent port in a second operating position, the defuel/vent valve closure structure having no elastomeric materials therein.

9. The fuel-control manifold of claim 8, wherein the body has three separate segments that are joined together, and wherein the shutoff valve is in an upper body segment and the defuel-valve is in a middle body segment.

10. The fuel-control manifold of claim 8, wherein the shutoff valve closure is a ball-valve closure.

11. The fuel-control manifold of claim 8, further including an instrumentation port in the body, the instrumentation port being in fluid-flow communication with the shutoff-valve second side.

12. The fuel-control manifold of claim 8, wherein the defuel/vent valve closure structure comprises
  a controllable ball-valve defueling closure having a defueling-valve first side in fluid-flow communication with the second shutoff-valve side and a defueling-valve second side in fluid-flow communication with the defueling port, and
  a controllable ball-valve vent closure having a vent-valve first side in fluid-flow communication with the vent port, and a vent-valve second side in fluid-flow communication with the defueling-valve second side, and wherein
the defueling closure and the vent closure are mounted on a common defuel/vent valve stem.

13. The fuel-control manifold of claim 8, wherein the defuel/vent valve closure structure comprises at least one nonmetallic solid component, and wherein each nonmetallic solid component is a thermosetting polymer.

14. A fuel-control manifold, comprising:
a body;
a tank port in the body;
an engine supply port in the body;
a fueling port in the body;
a shutoff valve in the body, the shutoff valve including a controllable shutoff valve closure having a shutoff-valve first side in fluid flow communication with the tank port and a shutoff-valve second side in fluid flow communication with the engine supply port and with the fueling port;
a defueling port in the body;
a vent port in the body; and
a defuel/vent valve structure in the body, the defuel/vent valve structure comprising
  a defueling closure having a defueling-valve first side in fluid-flow communication with the shutoff-valve second side and a defueling-valve second side in fluid-flow communication with the defueling port, and
  a vent closure having a vent-valve first side in fluid-flow communication with the vent port, and a vent-valve second side in fluid-flow communication with the defueling-valve second side,
wherein the defueling closure and the vent closure cannot be open at the same time, the shutoff valve and the defuel/vent valve being leak free over a temperature range of from −40° F. to +180° F. and over a pressure range of from 72 pounds per square inch to 6000 pounds per square inch.

15. The fuel-control manifold of claim 14, wherein the body has three separate segments that are joined together.

* * * * *